United States Patent
Aher et al.

(10) Patent No.: US 12,075,115 B2
(45) Date of Patent: Aug. 27, 2024

(54) SUPPLEMENTAL AUDIO GENERATION SYSTEM IN AN AUDIO-ONLY MODE

(71) Applicant: Rovi Guides, Inc., San Jose, CA (US)

(72) Inventors: Ankur Anil Aher, Maharashtra (IN); Charishma Chundi, Andhra Pradesh (IN); Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/339,533

(22) Filed: Jun. 4, 2021

(65) Prior Publication Data

US 2022/0394323 A1    Dec. 8, 2022

(51) Int. Cl.
*H04N 21/439* (2011.01)
*H04N 21/44* (2011.01)
*H04N 21/81* (2011.01)
*H04N 21/8549* (2011.01)

(52) U.S. Cl.
CPC ..... *H04N 21/439* (2013.01); *H04N 21/44008* (2013.01); *H04N 21/8133* (2013.01); *H04N 21/8549* (2013.01)

(58) Field of Classification Search
CPC .......... H04N 21/439; H04N 21/44008; H04N 21/8133; H04N 21/8549
See application file for complete search history.

(56) References Cited

U.S. PATENT DOCUMENTS

| | | | |
|---|---|---|---|
| 6,172,675 B1* | 1/2001 | Ahmad | G11B 27/034 715/251 |
| 7,761,892 B2 | 7/2010 | Ellis et al. | |
| 10,225,621 B1* | 3/2019 | Newell | H04N 21/43078 |
| 10,250,940 B2* | 4/2019 | Ashoori | H04N 21/466 |
| 2008/0046936 A1* | 2/2008 | Dam | H04N 21/8455 725/135 |
| 2013/0308921 A1* | 11/2013 | Budzinski | H04N 9/8205 386/E9.011 |
| 2014/0130073 A1* | 5/2014 | Yu | H04N 21/44218 725/14 |
| 2015/0178291 A1* | 6/2015 | Chen | H04N 21/4394 700/94 |
| 2015/0189339 A1* | 7/2015 | Sood | H04N 21/812 725/32 |
| 2016/0018959 A1* | 1/2016 | Yamashita | G06F 3/0484 715/716 |
| 2017/0041680 A1* | 2/2017 | Lewis | H04N 21/4621 |
| 2019/0007732 A1* | 1/2019 | Havinal | H04N 21/4334 |
| 2020/0280768 A1* | 9/2020 | Lewis | H04N 21/23439 |
| 2020/0285440 A1* | 9/2020 | Prindle | G06F 16/9566 |
| 2021/0281929 A1* | 9/2021 | Wu | H04N 21/85406 |

* cited by examiner

*Primary Examiner* — Michael R Telan
(74) *Attorney, Agent, or Firm* — Haley Guiliano LLP (57) ABSTRACT

Systems and methods for generating supplemental audio for an audio-only mode are disclosed. For example, a system generates for output a content item that includes video and audio. In response to determining that an audio-only mode is activated, the system determines that a portion of the content item is not suitable to play in the audio-only mode. In response to determining that the portion of the content item is not suitable to play in the audio-only mode, the system generates for output supplemental audio associated with the content item during the portion of the content item.

20 Claims, 10 Drawing Sheets

Access a first portion of content item that is not suitable for an audio-only mode

904

Is the first portion longer than a threshold period?

YES — 906

Skip presentation of the first portion of the content item

NO — 908

Present the first portion of the content item in the audio-only mode

910

Continue with a content item until a second portion That is unsuitable for an audio-only mode is detected

SUPPLEMENTAL AUDIO GENERATION SYSTEM IN AN AUDIO-ONLY MODE

BACKGROUND

The present disclosure relates to content delivery and more particularly, generating supplemental audio content during a portion of a content item that is unsuitable to play in an audio-only mode.

SUMMARY

Media services may allow users to consume audio-visual content in many different modes. In one way, audio-visual content can be consumed in a video mode (e.g., a user is watching TV at home), allowing the user to view the video and hear the audio of the content. In another way, audio-visual content can be consumed in an audio-only mode (e.g., if a user is not able to engage with a display of a media device). For example, the user may be driving a car or going for a run; thereby, the user is not able to consume the video content and is only able to consume the audio content of the content item.

However, there may be specific portions in the video content that are not suitable for an audio-only mode. In one example, some scenes include "video text" that is output in the video but not in audio (e.g., text that is only shown on the video) where the video text is pertinent to the understanding of the audio. In another example, some scenes may not include any audio and only include video (e.g., audio inactivity period such as silent scenes). Some content may include audio, but the audio may not give enough context to the storyline of the content item (e.g., meaningful video content with background music only). All of these situations could be inconvenient and distracting to the users because the users may not get enough context for the content item or may have to perform additional steps to fully understand the content.

For example, if the user needs a video text in order to make sense of the content item, then the user may have to replay the portion that includes the video text (since it does not make sense without the video text). This may slow down the playback and waste processing capabilities and bandwidth, since video requires more bandwidth than audio. During the audio inactivity period, the user may wonder what is going on in the video since the user does not hear any sound. Then the user would have to turn the video mode back on. Because using the video mode is computationally more extensive than using the audio-only mode, this may end up consuming more computational power and resources. If the content includes a meaningful video with minimal audio that does not give much context to the storyline, then the users may lose interest in the content item due to not being able to fully follow the content item. The user may have to consume additional content in order to understand the content item (e.g., looking up the ending explained or spoiler information on Internet), which will require additional processing power and bandwidth to download more content and degrade the user's experience.

To address these problems, the methods and systems are described herein for providing supplemental audio during a portion of a content item that is not suitable to play in an audio-only mode. For example, a content item that includes video and audio (e.g., movie) is generated for output. A media application implemented on a device determines whether an audio-only mode is activated. There may be different ways that trigger an audio-only mode. In one example, the media application can determine that the audio-only mode is activated based on a device feature, such as determining that a display of the device is turned off (e.g., a screen of a mobile phone is turned off). In a related example, the media application can determine that the audio-only mode is activated based on device orientation, such as determining that the device is turned upside down, thereby the screen is facing the floor.

In another example, the media application may determine that the audio-only mode is activated based on analyzing user action. A user may specifically request to activate the audio-only mode in anticipation of performing physical activities. The media application uses one or more sensors implemented on the device to determine that the user is not engaged with a display of the device. For example, a camera of the device can detect that the user is not facing the device or the eye gaze is not oriented toward the screen of the device. A motion sensor of the device can detect that the user is far away from the device (e.g., engaging with the device in a different room via Bluetooth) or the user is engaged in a physical activity (e.g., running). The media application may receive data from a health-related application, such as the number of steps the user takes or a running distance. In one example, the media application can determine that the audio-only mode is activated based on bandwidth availability. If the device determines that a substantial drop in bandwidth has occurred, which limits the media application from requesting or downloading video segments, then the media application may determine that the audio-only mode is activated.

Upon determining that the audio-only mode is activated, the media application determines whether a portion of the content item is not suitable to play in the audio-only mode. For example, the content that includes text that is shown only in the video but not heard in audio is not suitable to play in an audio-only mode because the user will not be able to read the text in the video in an audio-only mode. In another example, the content may include audio that is not meaningful unless it is consumed with the video (e.g., actions being performed in silence). The content may not have any audio. The audio level of the portion of the content item may be low. The portion of the content item may only include background music. For the portion that is not suitable to play in the audio-only mode, the media application generates supplemental audio associated with the content item for output.

In some embodiments, metadata of the content item may be dynamically generated and personalized for each user. The media application may access multiple sources of metadata and generate the metadata that can be used to generate the supplemental content. The supplemental content includes any material that is related to the content item. When the supplemental content is generated based on text information, any text-to-speech techniques may be used.

In one example, the supplemental content can be generated based on the text displayed in the video that is not output as audio (e.g., interview question posted to a soccer player such as "Which player loves Instagram?"). The supplemental content may include information about the character of the content item, such as character information or music of the content item (e.g., "This character was played by Emma Watson."). The supplemental content may include commentary and rating of the content item retrieved from a third-party database (e.g., "This movie received 3.5 stars."). The supplemental content may include bonus content and trivia about the content item ("Did you know that Bill is not the villain here?"). The supplemental content may include information received via social media networks. Information about the content item such as comments posted by the user's connections on the social network may be retrieved from a database of the social network (e.g., "80% of your friends liked this movie.").

In one embodiment, if the bandwidth availability is low, then the media application may cease the presentation of the video segment or skip a corresponding segment to save the network bandwidth. Instead of outputting the supplemental audio content, a portion of the content item that is not suitable to play in an audio-only mode may be skipped. In another embodiment, if a portion of the content item that is not suitable to play in an audio-only mode is longer than a threshold value (e.g., two minutes), then the portion may be skipped. Because the portion that is not suitable for the audio-only mode is too long, the media application may skip the portion instead of providing supplemental content for the purpose of streamlining content consumption.

In some embodiments, when the audio-only mode is deactivated, the media application generates a video summary of the content item for the portion that was played in an audio-only mode. Once the user arrives home from jogging and switches back to the video mode, then the user may want to view a quick recap of the portion of the video that the user missed due to the content item being played in an audio-only mode. Because the user may have already heard the dialogue in an audio-only mode, the video summary may include a higher portion of non-dialogue frames than dialogue frames to provide more visual context of the portion of the content item the user did not get to watch.

The present disclosure addresses the problem of presenting certain content that is not suitable to play in an audio-only mode by, for example, generating supplemental audio content associated with the content item for output during a portion that is not suitable to play in on audio-only mode. The present disclosure saves network bandwidth and reduces network traffic by not replaying the video or downloading video segments of the content item. The present disclosure also saves processing power and computer resources by not requesting or downloading additional content that may be necessary to clarify the context or reduce confusion.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
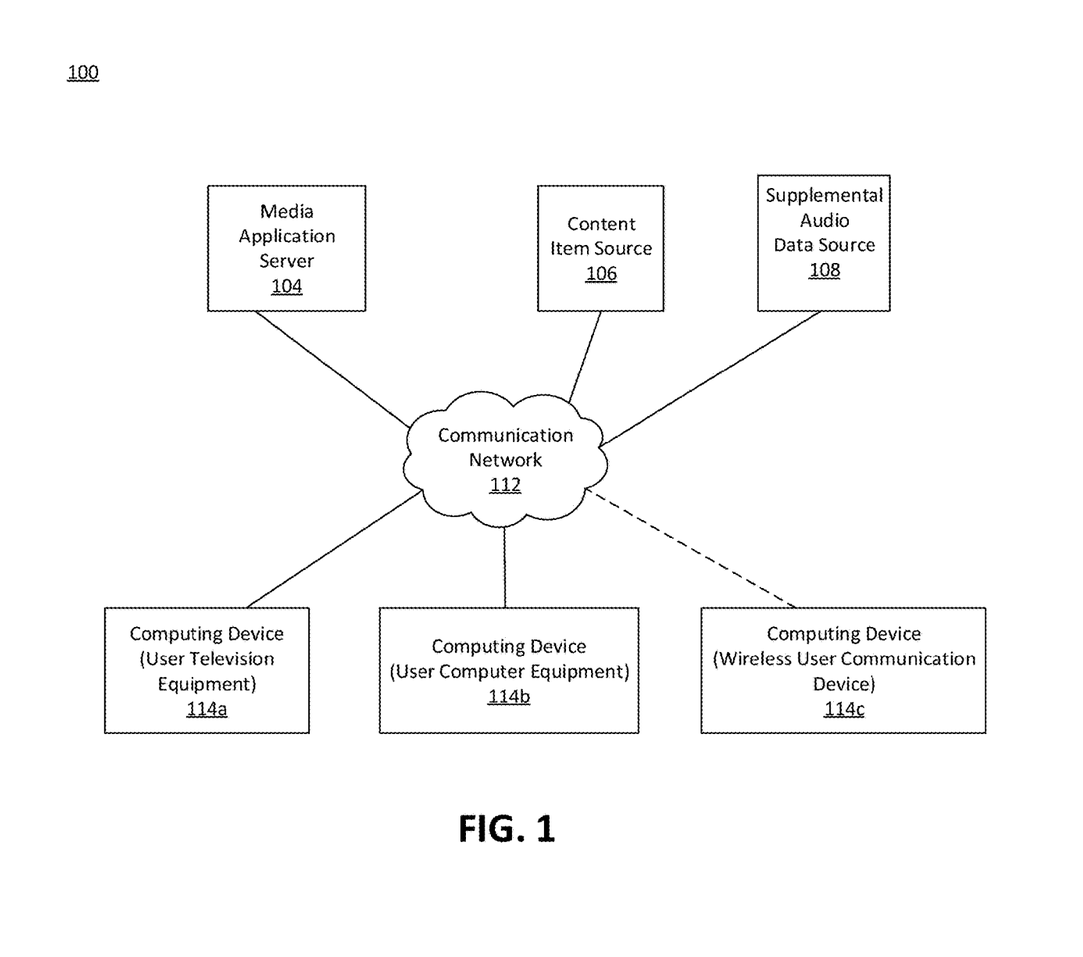
FIG. 1 depicts an illustrative block diagram of a system for providing supplemental audio in an audio-only mode, in accordance with some embodiments of the disclosure.

FIG. 1 shows an illustrative block diagram of a system 100 for providing supplemental audio content in an audio-only mode, in accordance with some embodiments of the disclosure. In one aspect, system 100 includes one or more media application servers 104, content item source 106, supplemental audio data source 108, and communication network 112.

Communication network 112 may be one or more networks including the Internet, a mobile phone network, mobile voice or data network (e.g., a 5G or LTE network), cable network, public switched telephone network, or other types of communication network or combinations of communication networks. Communication network 112 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 112 communicatively couples various components of system 100 to one another. For instance, media application server 104 may be communicatively coupled to content item source 106, and/or supplemental audio data source 108 via communication network 112.

A video-hosting web server (not shown) hosts one or more video websites that enable users to download or stream videos, video clips, and/or other types of content. In addition to enabling users to download and view content, the video websites also provide access to data regarding downloaded content such as subtitles, closed caption data, metadata, or manifest.

Content item source 106 may store content item-related data from one or more types of content providers or originator of content (e.g., a television broadcaster, a Webcast provider, on-demand content provider, over-the-top content providers, or other providers of content). Content item source includes a content item, metadata associated with the content item, manifest associated with the content item, or any other related material associated with the content item. The manifest or metadata of the content item may include content-related information that may be retrieved from multiple sources. A remote media server may be used to store different types of content in a location remote from computing device 114 (described below). Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Supplemental audio data source 108 may store supplemental audio data associated with a content item, such as audio files or metadata associated with a content item that is used to generate the supplemental audio content. The metadata or manifest of the content item may be dynamically generated and personalized for each user. The media application may access multiple sources of metadata and generate the metadata or manifest that may be used to generate the supplemental content. The supplemental content includes any material that is related to the content item. When the supplemental audio content is generated based on text information, any text-to-speech techniques may be used.

In some embodiments, content item data from a video-hosting server may be provided to computing device 114 using a client/server approach. For example, computing device 114 may pull content item data from a server (e.g., media application server 104), or the server may push content item data to computing device 114. In some embodiments, a client application residing on computing device 114 may initiate sessions with supplemental audio data source 108 for the content item data when needed.

Content and/or content item data delivered to computing device 114 may be over-the-top (OTT) content. OTT content delivery allows Internet-enabled user devices, such as computing device 114, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer I.P. packets provided by the OTT content provider. Examples of OTT content providers include YouTube™ or Netflix™ which provide audio and video via I.P. packets. YouTube™ is a trademark owned by Google Inc., Netflix™ is a trademark owned by Netflix Inc. OTT content providers may additionally or alternatively provide content item data described above. In addition to content and/or content item data, providers of OTT content can distribute applications (e.g., web-based applications or cloud-based applications), or the content can be displayed by applications stored on computing device 114.

As described in further detail below, media application server 104 accesses the content of the video website(s) hosted by a video-hosting web server (not shown) and, based on the data associated with accessed content, generates supplemental audio content to.

System 100 also includes one or more computing devices 114, such as user television equipment 114a (e.g., a set-top box), user computer equipment 114b, and wireless user communication device 114c (e.g., a smartphone device or remote control), which users can use to interact with media application server 104, supplemental audio data source 108, and/or content item source 106, via communication network 112, to search for desired content item content. For instance, in some aspects, media application server 104 may provide a user interface via computing device 114, by which a user can input a query for a particular item of content item content made available by content item source 106, and generate signs for the content item in response to the query by accessing and/or processing data, closed caption data, subtitles, manifest, and/or metadata. Although FIG. 1 shows one of each component, in various examples, system 100 may include multiples of one or more illustrated components.

Figure 2:
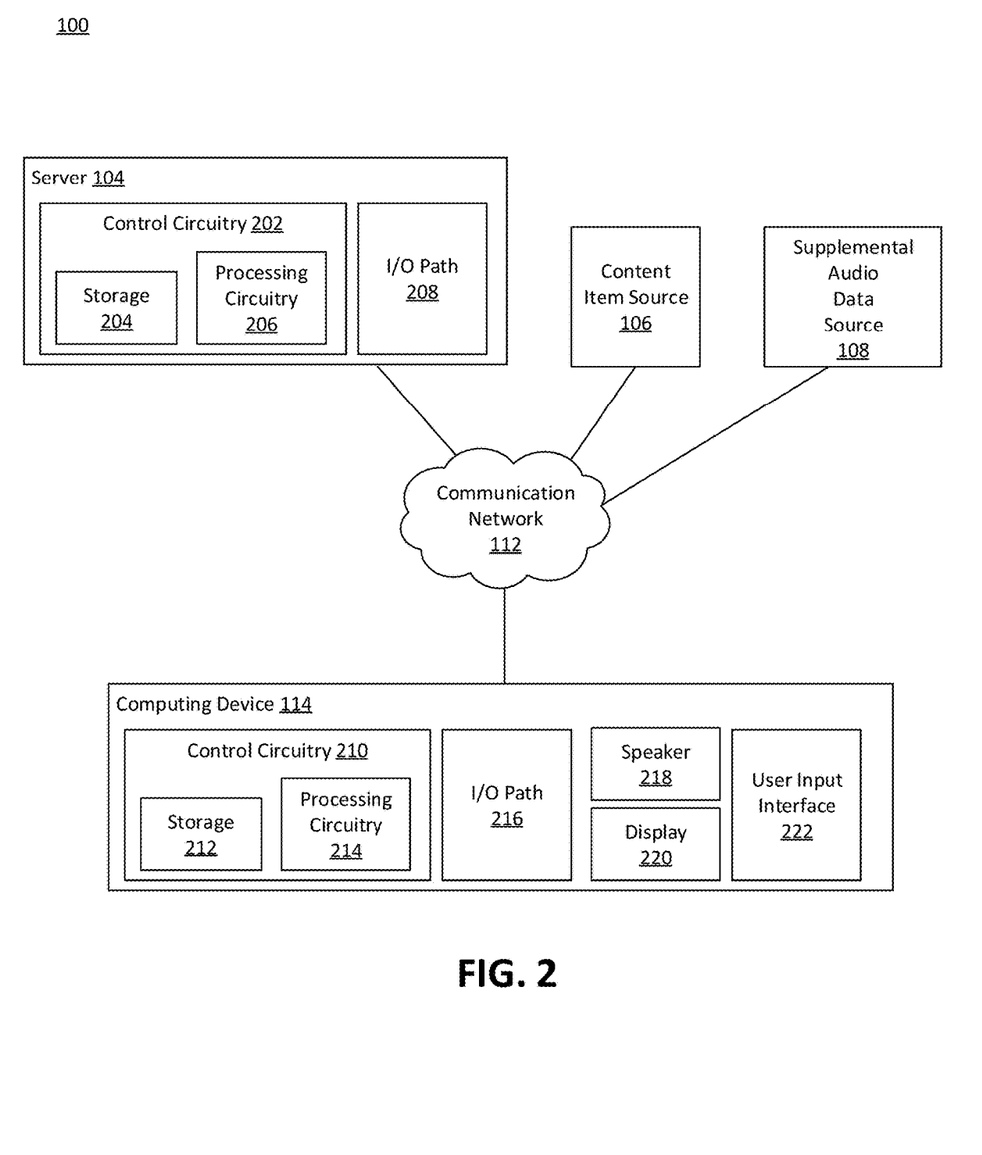
FIG. 2 depicts an illustrative block diagram showing additional details of the system of FIG. 1, in accordance with some embodiments of the disclosure.

FIG. 2 is an illustrative block diagram showing additional details of the system 100 of FIG. 1, in accordance with some embodiments of the disclosure. In particular, media application server 104 includes control circuitry 202 and Input/Output (I/O) path 208, and control circuitry 202 includes storage 204 and processing circuitry 206. Computing device 114 includes control circuitry 210, I/O path 216, speaker 218, display 220, user input interface 222, camera 224, and microphone 226. Control circuitry 210 includes storage 212 and processing circuitry 214. Control circuitry 202 and/or 210 may be based on any suitable processing circuitry such as processing circuitry 206 and/or 214.

As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 204, storage 212, and/or storages of other components of system 100 (e.g., storages of content item source 106, supplemental audio data source 108, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (B.D.) recorders, BLU-RAY 3D disc recorders, digital video recorders (DVR, sometimes called a personal video recorder, or PVR), solid state devices, quantum storage devices, gaming consoles, gaming content item, or any other suitable fixed or removable storage devices, and/or any combination of the same. Each of storage 204, storage 212, and/or storages of other components of system 100 may be used to store various types of content, content item data, and or other types of data. Non-volatile memory may also be used (e.g., to launch a boot-up routine and other instructions). Cloud-based storage may be used to supplement storages 204, 212 or instead of storages 204, 212.

In some embodiments, control circuitry 202 and/or 210 executes instructions for an application stored in memory (e.g., storage 204 and/or 212). Specifically, control circuitry 202 and/or 210 may be instructed by the application to perform the functions discussed herein. For example, the application may be implemented as software or a set of executable instructions that may be stored in storage 204 and/or 212 and executed by control circuitry 202 and/or 210. In some embodiments, the application may be a client/server application where only a client application resides on computing device 114, and a server application resides on media application server 104.

The application (e.g., media application) may be implemented using any suitable architecture. For example, it may be a stand-alone application wholly implemented on computing device 114. For example, the media application may be implemented as software or a set of executable instructions, which may be stored in non-transitory storage 204, 212 and executed by control circuitry 202, 210. In such an approach, instructions for the application are stored locally (e.g., in storage 212), and data for use by the application is downloaded on a periodic basis (e.g., from an out-of-band feed, from an Internet resource, or using another suitable approach). Control circuitry 202, 210 may retrieve instructions for the application from storage 204, 212 and process the instructions to perform the functionality described herein. Based on the processed instructions, control circuitry 202, 210 may determine what action to perform when input is received from user input interface 222 of computing device 114.

In client/server-based embodiments, control circuitry 202, 210 may include communication circuitry suitable for communicating with an application server (e.g., media application server 104) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths (e.g., communication network 112).

In another example of a client/server-based application, control circuitry 202, 210 runs a web browser that interprets web pages provided by a server (e.g., media application server 104). For example, the server may store the instructions for the application in a storage device. The remote server may process the stored instructions using circuitry (e.g., control circuitry 202) and generate the displays discussed above and below. Computing device 114 may receive the displays generated by the remote server and may display the content of the displays locally via display 220. This way, the processing of the instructions is performed remotely (e.g., by media application server 104) while the resulting displays are provided locally on computing device 114. Computing device 114 may receive inputs from the user via input interface 222 and transmit those inputs to the server for processing and generating the corresponding displays.

A user may send instructions to control circuitry 202 and/or 210 received via user input interface 222. User input interface 222 may be any suitable user interface, such as a remote control, trackball, keypad, keyboard, touchscreen, touchpad, stylus input, joystick, voice recognition interface, or other user input interfaces. User input interface 222 may be integrated with or combined with display 220, which may be a monitor, a television, a liquid crystal display (LCD), an electronic ink display, or any other equipment suitable for displaying visual images.

A camera 224 of computing device 114 may capture an image or a video. The image or video may be used in connection with a face detection algorithm to detect a face of the user. The image or video may be used in connection with a speech recognition algorithm to decipher a speech and determine an identify of the speaker. A microphone 226 of computing device 114 may detect sound in proximity to computing device 114 and converts the sound to electrical signals. The detected sounds may be converted to text using voice-to-text techniques.

Media application server 104 and computing device 114 may receive content and data via I/O paths 208 and 216, respectively. I/O paths 208, 216 may provide content (e.g., broadcast programming, on-demand programming, Internet content, the content available over a local area network (LAN) or wide area network (WAN), and/or other content) and data to control circuitry 202, 210. Control circuitry 202, 210 may be used to send and receive commands, requests, and other suitable data using I/O paths 208, 216. I/O paths 208, 216 may connect control circuitry 202, 210 (and specifically processing circuitry 206, 214) to one or more communication paths (described below). I/O functions may be provided by one or more of these communication paths but are shown as single paths in FIG. 2 to avoid overcomplicating the drawing.

Figure 3:
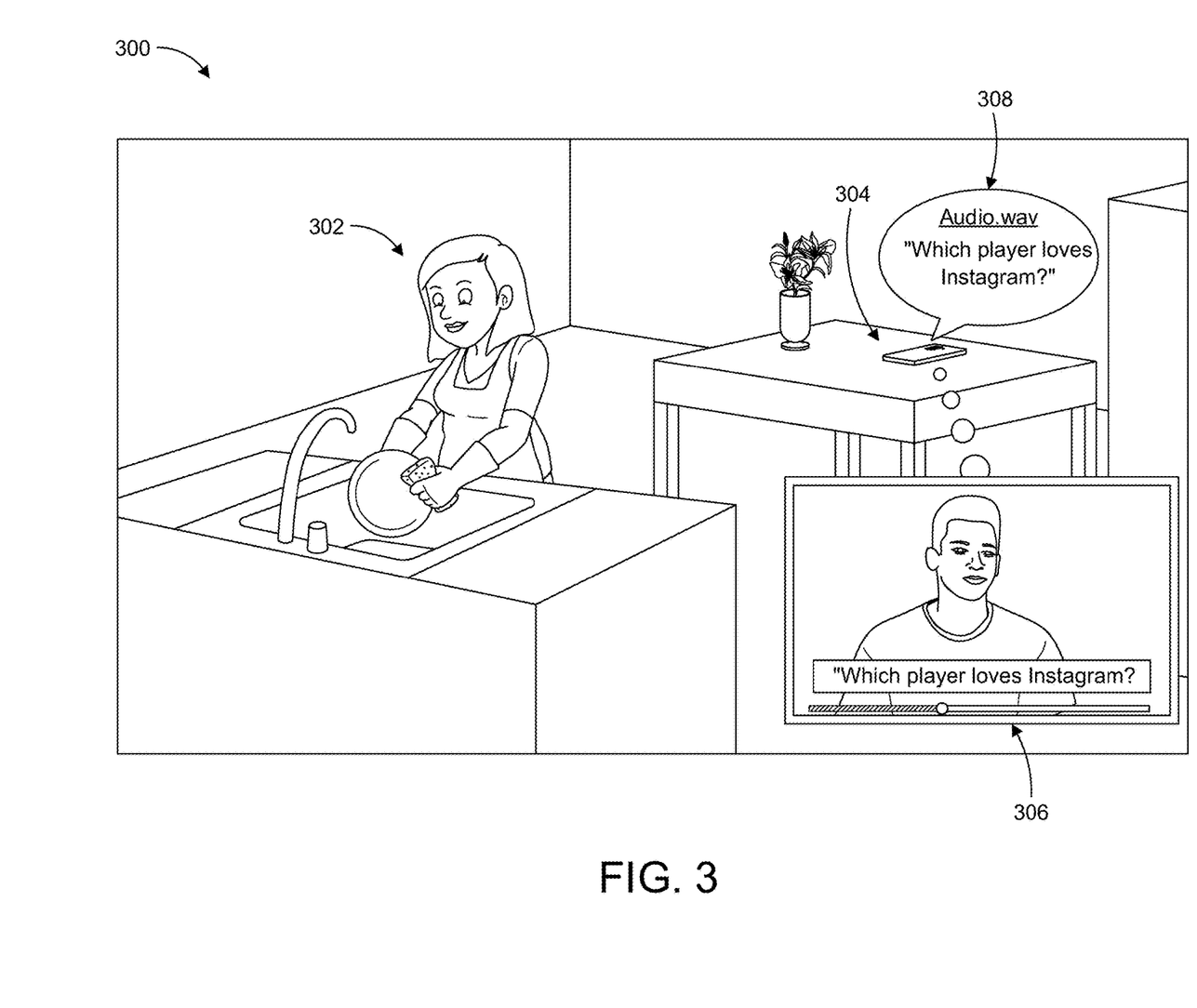
FIG. 3 depicts an exemplary embodiment of providing supplemental audio on an illustrative device, in accordance with some embodiments of the disclosure.
Figure 4:
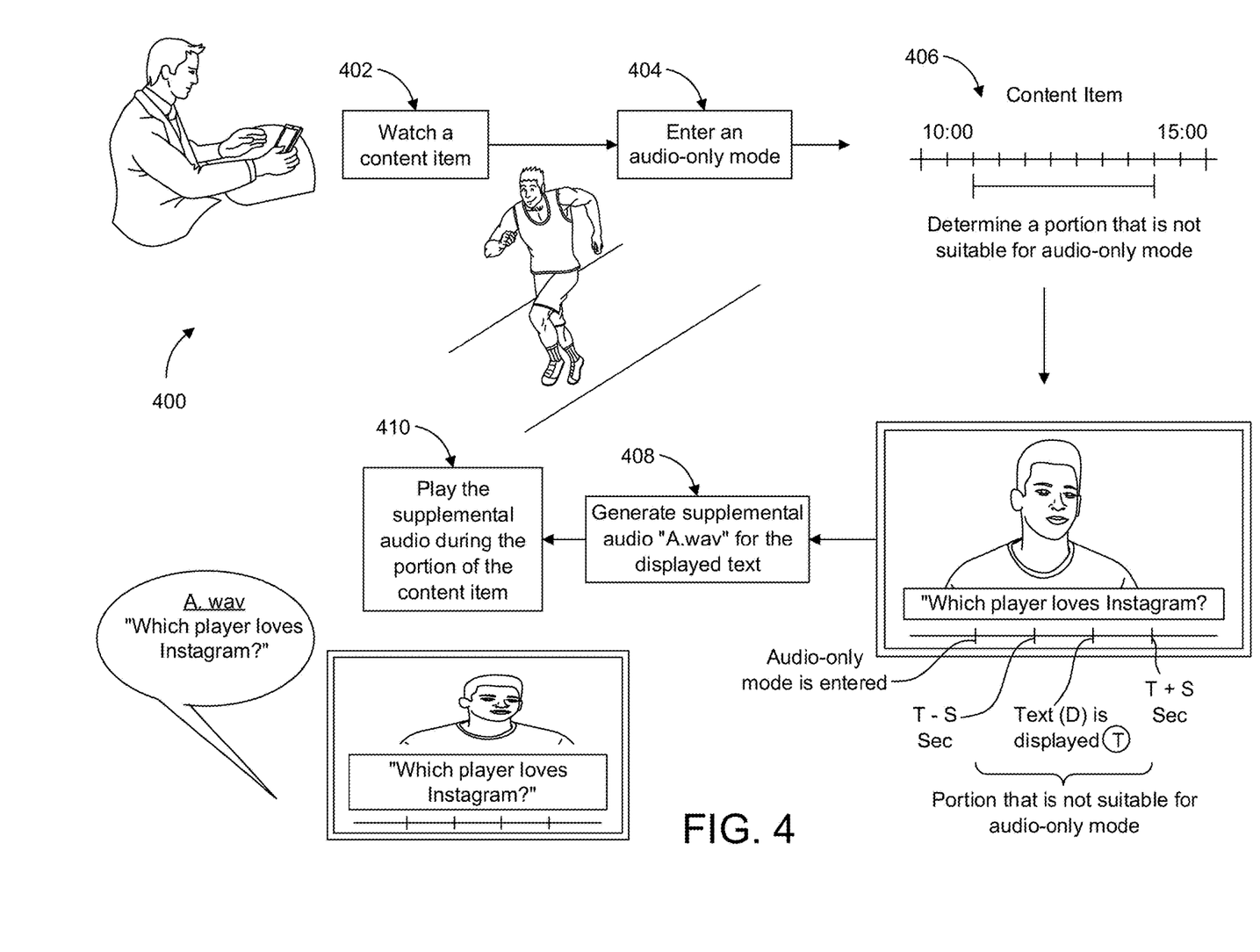
FIG. 4 depicts an exemplary embodiment of generating supplemental audio in an audio-only mode on an illustrative device, in accordance with some embodiments of the disclosure.

Having described system 100, reference is now made to FIG. 3, which depicts an example embodiment 300 for generating for output supplemental audio on the illustrative device that may be implemented using system 100, in accordance with some embodiments of the disclosure. Reference is also made to FIG. 4, which shows example embodiment 400 generated by system 100, in accordance with some embodiments. Although FIGS. 3-4 depict a certain type of user device, it will be understood that any suitable device for displaying video content may be used, such as gaming equipment, user computer equipment, or a wireless user communications device.

The user device may have control circuitry 210 of FIG. 2 configured to request the video content of the content item from a server for display. It will be understood that, consistent with the present disclosure, any content item may be requested for streaming or downloading from media application server 104.

As referred to herein, the term "content item" should be understood to mean an electronically consumable user asset, such as an electronic version of a printed book, electronic television programming, as well as pay-per-view program, on-demand program (as in video-on-demand (VOD) system), Internet content (e.g., streaming content, downloadable content, Webcasts, etc.), video clip, audio, content information, picture, rotating image, document, playlist, website, article, book, article, newspaper, blog, advertisement, chat session, social content item, application, games, and/or any other content item or multi content item and/or combination of the same.

As shown in FIG. 3, a user 302 plays a content item (e.g., soccer player interview video) via a media application implemented on a user device 304 and goes to the kitchen to wash dishes. Now that user 302 is away from user device 304 and is not able to engage with a display of user device 304 (due to washing dishes), the media application may determine that an audio-only mode needs to be activated. For example, a camera of user device 304 may no longer detect the face of user 302. A microphone of user device 304 may detect that user voice is distant from the device. User device 304 may detect that a smart watch connected to user device 304 is a certain distance away from user device 304. Based on one or more of these factors, the media application activates the audio-only mode and keeps on playing the content item. When the content item arrives at a segment 306, the media application determines that segment 306 includes video text (e.g., interview question) that is only displayed in the video but not in audio. Because a producer of the content item may be using the video text to communicate the intended message (interview question), segment 306 lacks audio. Since the video text is vital to understand the answer that is preceded by the interview question, the media application determines that segment 306 is not suitable to play in the audio-only mode. In some embodiments, any natural language processing techniques, such as word2vec, may be used to determine whether the video text is pertinent to the following audio. For example, vectors may be created from the video text and the vectors of the audio are created. The vectors may be compared against each other to determine how closely the video text and the following audio are related. Upon determining that the video text is closely related to the following audio, the media application generates supplemental audio based on the displayed text for segment 306. The interview question is converted to audio using text-to-audio techniques, and the supplemental audio corresponding to the video text is output so that the user can hear the interview question while doing dishes.

FIG. 4 depicts an exemplary embodiment 400 for generating supplemental audio in an audio-only mode, in accordance with some embodiments of the disclosure. The client device can be any user television or gaming equipment 114a, user computer equipment 114b, or wireless user communications device 114c discussed above in relation to FIG. 1. It should be noted that embodiment 400 may be performed by control circuitry 202, 210 of FIG. 2 as instructed by the media application that may be performed on any client device. In addition, one or more steps of embodiments 400-1000 may be incorporated into or combined with one or more steps of any other processes or embodiments described in the present disclosure.

At step 402, the user requests presentation of a content item (e.g., soccer player interview video) via the media application on computing device 114. In response to the request, the content item is played on computing device 114. While watching the content item, the user decides to go for a run. As the user starts running, computing device 114 determines that the user is engaged in a physical activity based on the number of steps the user takes measured by a health-related application and sends the data to the media application. Because the user is engaged in the physical activity, the audio-only mode is activated at step 404 (due to the user's inability to engage with a display of the computing device).

At step 406, the media application analyzes the content item and determines that a portion of the content item is not suitable to play in an audio-only mode. For example, the media application determines one or more factors, such as a hertz level of the audio, the presence of the dialogue in the audio, the presence of the vocal track in the audio, the presence of the background music in the audio, the duration of the audio inactivity period, or the presence of video text. Although these example factors are used to describe how the media application determines whether a certain portion of the content item is not suitable to play in an audio-only mode, any factors may be used to determine whether the certain portion of the content item is unsuitable to play in an audio-only mode.

As one example, the media application processes the video frames and identifies that a segment displays video text. For the segment that includes the video text, the media application identifies the time ("T") of the video when text ("D") is displayed and extracts the displayed text ("D") from the video. The media application extracts, if any, audio for a predetermined range that includes the identified time ("T"), such as from T−5 seconds to T+5 seconds. The media application analyzes the extracted audio to determine whether the extracted audio from T−5 seconds to T+5 seconds includes the extracted text ("D"). For example, the extracted audio from T−5 seconds to T+5 seconds is converted to text ("Z") and the media application compares whether the converted text ("Z") includes the displayed text ("D") to determine whether the audio in the predetermined period mentions the displayed text. If the converted text ("Z") includes the displayed text ("D"), then the media application continues to the next segment without generating supplemental audio.

If the converted text ("Z") does not include the displayed text ("D"), then the media application converts the displayed text ("D") to audio ("A.wav") as the supplemental audio at step 408. The media application stores the supplemental audio ("A.wav") as audio-only mode enhancement metadata in content item source 106 or supplemental audio data source 108. In some embodiments, the supplement content may be prepared while preparing the content for streaming (e.g., encoding, transcoding, packaging, etc.) before the content is generated for display. Alternatively, the supplemental content may be generated on the fly during a request for playback of the content item. At step 410, the media application plays the supplemental audio at the identified time ("T").

In some embodiments, the supplemental audio may be generated by using a voice sample based on the context of the video. For example, a male voice sample may be selected for a male character or male narration. A child voice sample may be used for a child character or children's animation.

The media application determines appropriate voice speed and voice insertion point based on factors such as an audio inactivity period or the next voice point in the audio. For example, the media application calculates the length of the generated supplemental audio and determines the point to insert the supplemental audio. In some embodiments, the Timed Text Markup Language (TTML) or Web Video Text Tracks Format (WebVTT) files may be analyzed to estimate the times when there will be audio gaps that need to be filled. For example, the start time and the end time can be used to make such a determination. The supplemental audio may not interfere with the next segment or cut into the actual content.

Figure 5:
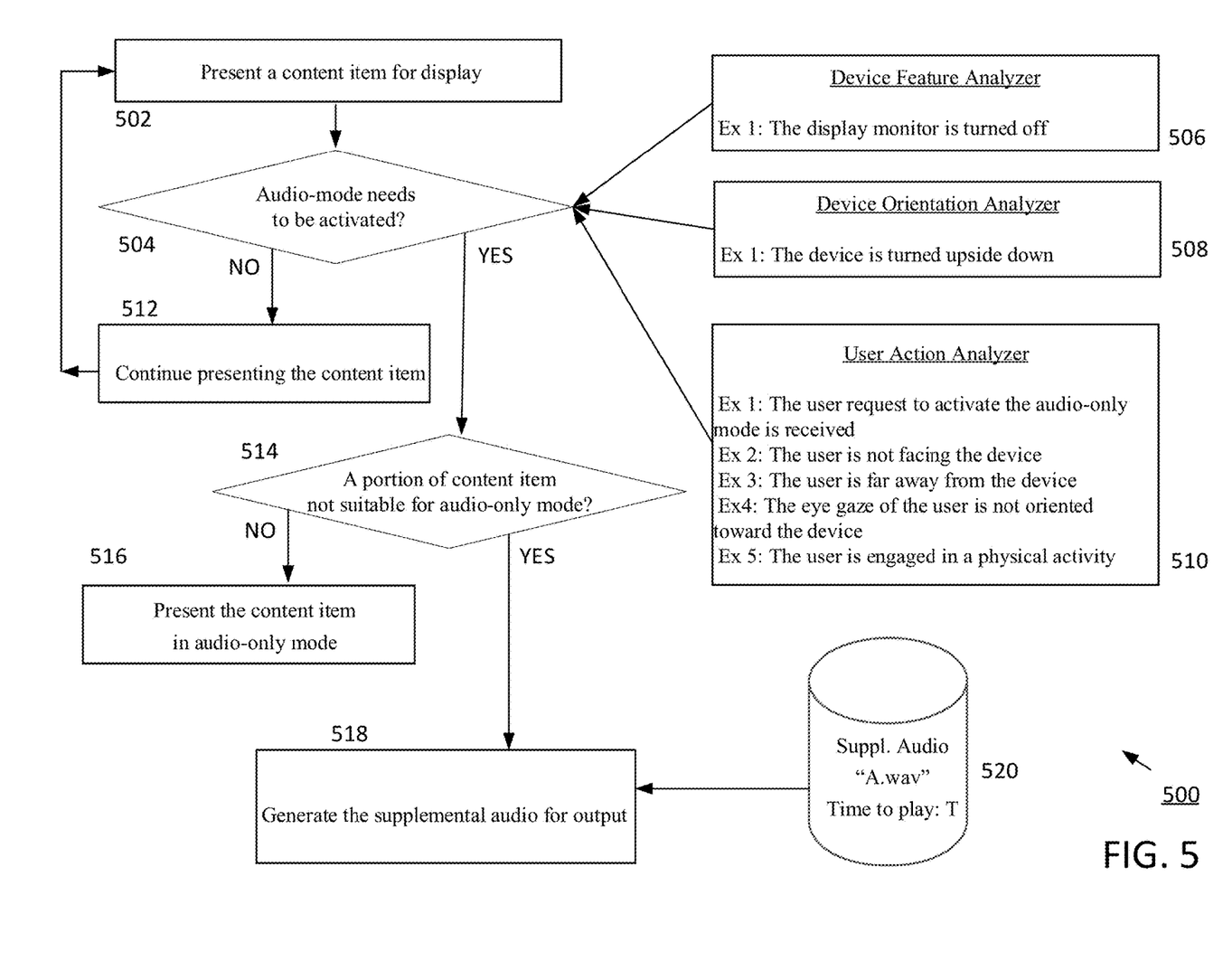
FIG. 5 depicts a flowchart of the process for providing supplemental audio in an audio-only mode, in accordance with some embodiments of the disclosure.

FIG. 5 depicts a flowchart of a process 500 of providing supplemental audio in an audio-only mode, in accordance with some embodiments of the disclosure. The computing device can be any user television or gaming equipment 114a, user computer equipment 114b, or wireless user communications device 114c discussed above in relation to FIG. 2. It should be noted that process 500 may be performed by control circuitry 202 of FIG. 2 as instructed by the media application that may be performed on any client device. In addition, one or more steps of flowcharts 800-1000 may be incorporated into or combined with one or more steps of any other processes or embodiments described in the present disclosure.

At step 502, the media application presents for display a content item on computing device 114. At step 504, the media application determines whether an audio-only mode is activated. There may be different ways to determine whether the audio-only mode is activated. In one example, the media application utilizes data received from existing sensors on computing device 114 to make such a determination. At step 506, the media application analyzes data related to a device feature, such as determining whether a display of the device is off (e.g., a device is locked or a monitor is turned off). At step 508, the media application analyzes data related to the orientation of the device, such as determining whether the device is turned upside down, thereby the screen is facing the floor. At step 510, the media application analyzes data related to user action. For example, a user may specifically request to activate the audio-only mode at playback in anticipation of performing physical activities. The media application may receive data from the health-related application, such as the number of steps the user takes or a running distance. The media application may receive data from one or more sensors, such as a camera or accelerometer implemented on the device and determine that the user is not engaged with a display of the device. For example, a camera of the device may detect that the user is not facing the device or the eye gaze is not oriented toward the device. A motion sensor of the device may detect that the user is far away from the device (e.g., engaging with the device in a different room via Bluetooth). In another example, the media application switches from video mode to the audio-only mode when a substantial drop in bandwidth is detected. If the device determines that a substantial drop in bandwidth has occurred, which may limit the media application from requesting or downloading video segments, then the media application may determine that the audio-only mode is activated to reduce the network consumption. Thus, one or more factors may be used to determine whether the audio-only mode is activated.

If the audio-only mode is not activated, the media application continues with presenting the content item in a video mode at step 512. If the audio-only mode is activated, then at step 514, the media application determines whether there is any portion of the content item that is not suitable to play in an audio-only mode. For example, the content may include audio that is not meaningful unless it is consumed with the video (e.g., actions being performed in silence or minimal audio). The content may include text that is shown only in the video but heard not in audio, and thus is not suitable to play in an audio-only mode because the user will not be able to read the video text in an audio-only mode. The content may lack audio for longer than a predetermined period and the user may wonder what is going on with the content. The content may only have background music that may not give enough context. The audio of the portion may have a low hertz level that requires additional visual help to understand the context. The audio may not have any vocal track or dialogue.

At step 518, in response to determining that a portion of content item is not suitable to play in an audio-only mode, the media application generates the supplemental audio based on metadata or manifest associated with the content item. The metadata or manifest of the content may be dynamically generated and personalized for each user. The media application may access multiple sources of metadata and generate the metadata that can be used to dynamically generate the supplemental content. The supplemental audio may be generated in real time. In some embodiments, the media application may retrieve the supplemental audio from a database of content item source 106 or supplemental audio data source 108. The supplemental audio or the metadata of the content item may have been created for another user and may be stored or cached in content item source 106 or supplemental audio data source 108. For example, the media application caches supplemental audio associated with a content item from a server of a content item source to store the supplemental audio data in a cache. At step 520, the media application may fetch the supplemental audio stored in content item 106 or supplemental audio data source 108. The media application plays the supplemental audio from the cache.

If the media application determines that a portion of the content item is suitable for an audio-only mode, at step 516, the media application continues to play the content item in an audio-only mode without the supplemental audio.

Figure 6:
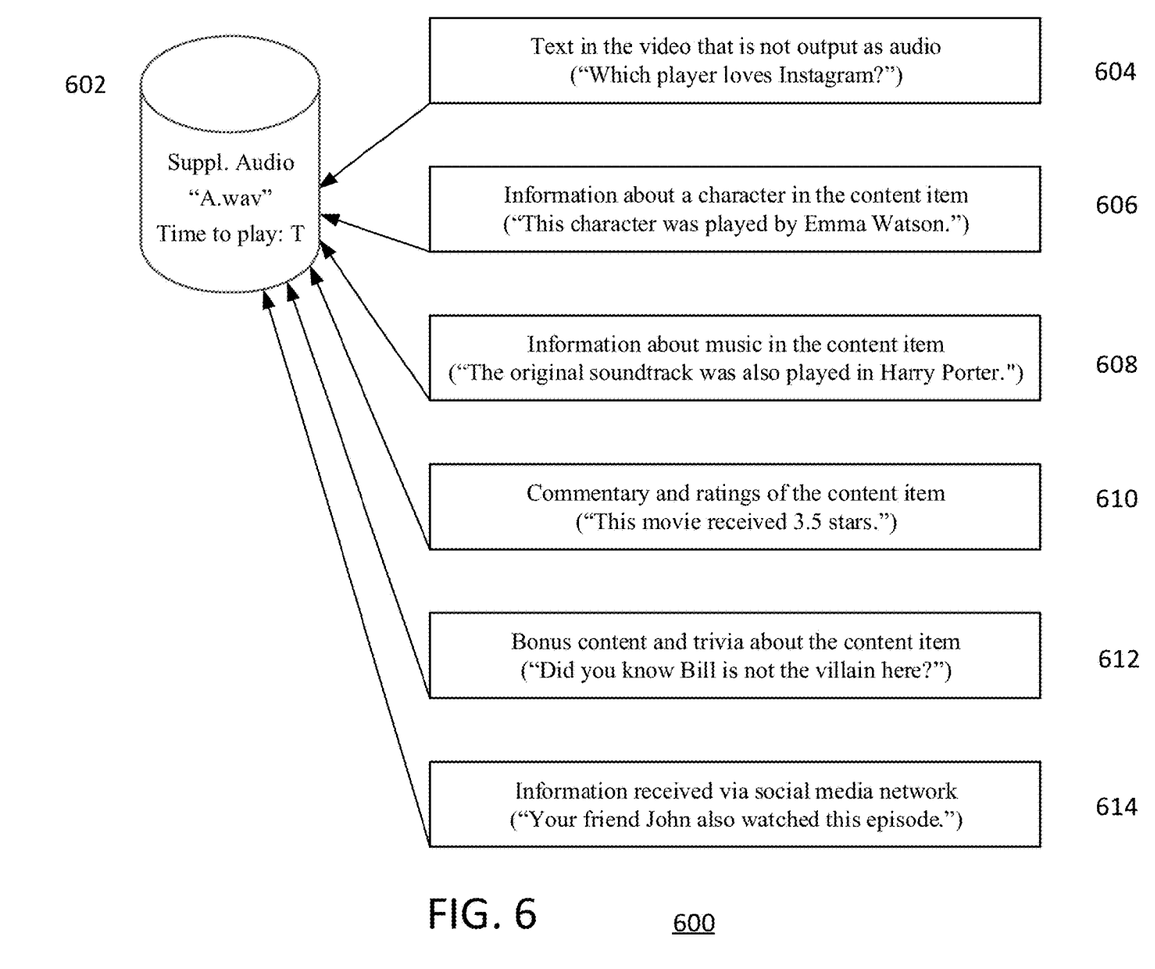
FIG. 6 depicts an exemplary embodiment of the supplemental audio content, in accordance with some embodiments of the disclosure.

FIG. 6 depicts exemplary supplemental audio content 602 that can be generated based on content-related data retrieved from multiple sources. There may be multiple sources that the media application accesses to retrieve content-related metadata or manifest to generate the supplemental content. For example, a third-party database (e.g., IMDB) may be used to retrieve trivia or FAQs related to the content item. The supplemental content may include bonus content and trivia related to a content item 612 ("Did you know that Bill is not the villain here?"). The supplemental content may include commentary and rating of the content item retrieved from a third-party database 610 (e.g., "This movie received 3.5 stars."). The media application may access an Internet database or web forum and retrieve information about the character of the content item or music of the content item. The supplemental content may include character information of the content item 606 (e.g., "This character was played by Emma Watson."). The supplemental content may include information about the music of the content item 608, such as the original soundtrack of the content item (e.g., "The original soundtrack was also played in 'Harry Potter.'").

In some embodiments, the media application accesses social media networks to retrieve comments or posts related to the content item. The supplemental content may include comments made by the user's friends on the social network 614 (e.g., "80% of your friends liked this movie."). Another exemplary supplemental content is advertisement-related content. For example, if the user is consuming a movie, "Godzilla vs. Kong," in audio-only mode, the user could hear the supplemental content such as "Reminder: 'Mortal Kombat' hits the theaters this Friday." The supplemental content may also be generated based on the text displayed in the video that is not output as audio 604 (e.g., interview question posted to a soccer player such as "Which player loves Instagram?" in FIG. 3). Although the above-listed examples are used to illustrate the supplemental audio content, any material related to the content item may be included in the supplemental content.

The supplemental audio can be played in a way that clearly informs the user that the supplemental audio is not part of the main content. For example, the supplemental audio can be preceded by a special sound or tone (e.g., ringtone). The supplemental audio may state even before the beginning of its content that the supplemental content is not part of the content item dialogue. For example, the supplemental audio may state, "Fact: This movie is not a remake of the original 'Godzilla' vs. 'Kong'" or "Trivia: This stone was actually used in 1890." The supplemental audio may have delimiter words that indicate that the audio that follows the delimiter words is not part of the actual content. The delimiter words may be repeated again after the supplemental audio ends. For example, "Bonus content. The director's intent in this scene was to show the cup for mise-en-scéne. Bonus content."

The supplemental content may be narrated to the user during a silent period or audio inactivity period so that supplemental audio or the narration does not interfere or cut into the current segment or upcoming segment. In some embodiments, the supplemental content may not include spoiler information and may comprise information that has already been presented.

Figure 7:
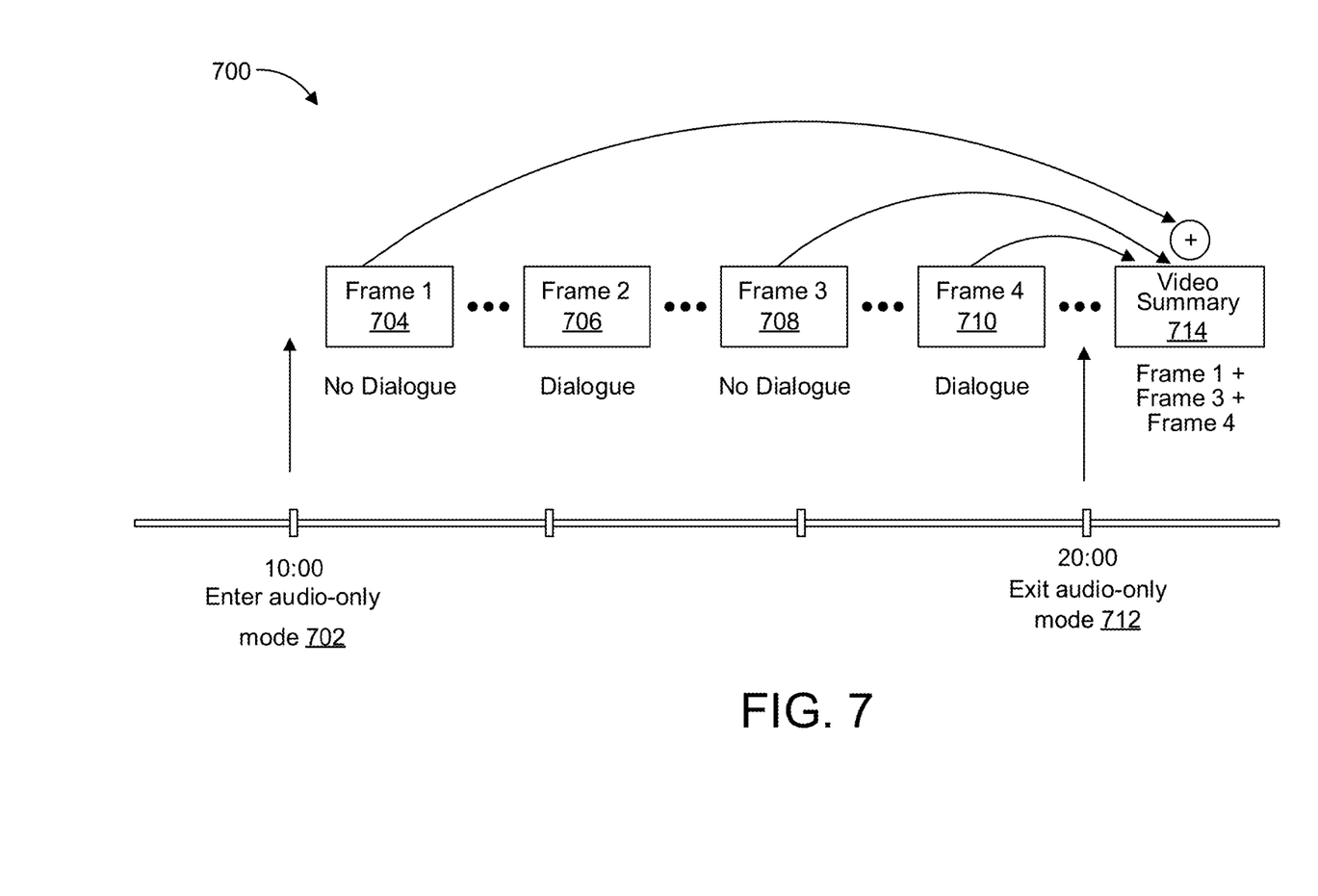
FIG. 7 depicts an exemplary embodiment of generating a video summary, in accordance with some embodiments of the disclosure.

FIG. 7 depicts an exemplary embodiment 700 of generating a video summary, in accordance with some embodiments of the disclosure. The media application determines whether the audio-only mode is deactivated. For example, once the user switches back to the video mode (e.g., arriving home from jogging and thereby can engage with a display of the device), then the user may want to switch to the video mode. If the user has more bandwidth availability at certain places (e.g., home), then the media application may switch to the video mode. Similar to the steps 506, 508, 510, the media application may determine one or more of factors such as device feature (e.g., whether the display is turned on), device orientation (e.g., the display of the device is facing up), user action (e.g., the user is close to the device or the eye gaze of the user is oriented toward the device). When the media application determines that audio-only mode is deactivated at step 712, the media application may generate a video summary 714 of the content item for a portion that was played in an audio-only mode (to display a quick recap of the portion of the video that the user missed due to the content item being played in an audio-only mode). Because the user may have already heard the dialogue in an audio-only mode, video summary 714 may include a higher portion of non-dialogue frames 704, 708 than the dialogue frame(s) 710 to provide more visual context of the content item the user did not get to watch.

Figure 8:
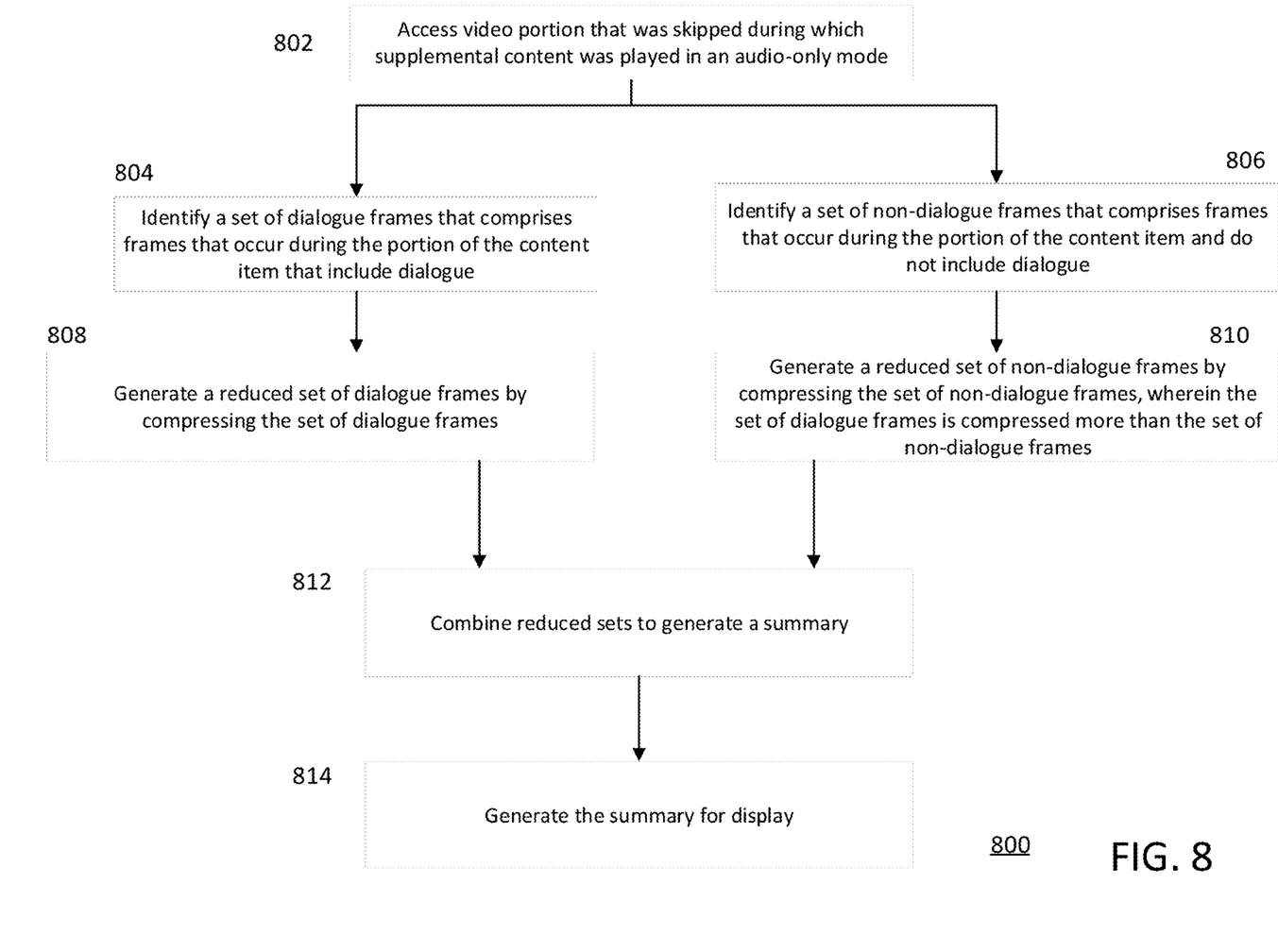
FIG. 8 depicts a flowchart of the process of generating a video summary, in accordance with some embodiments of the disclosure.

FIG. 8 depicts a flowchart of the process 800 of generating a video summary, in accordance with some embodiments of the disclosure. At step 802, the media application accesses a video portion that was skipped, during which supplemental content was played in an audio-only mode. The media application identifies frames that occur during the audio-only mode. In this exemplary embodiment, there are four frames 704, 706, 708, 710 in between when the user enters audio-only mode 702 and when the user exits audio-only mode 712. At step 804, the media application identifies a set of dialogue frames 706, 710 that comprises frames that occur during the portion of the content item that includes dialogue. At step 808, the media application generates a reduced set of dialogue frames 710 by compressing the set of dialogue frames 706, 710.

At step 806, the media application identifies a set of non-dialogue frames 704, 708 that comprises frames that occur during the portion of the content item that include non-dialogue. At step 810, the media application generates a reduced set of non-dialogue frames by compressing the set of dialogue frames (not shown in the exemplary embodiment). In some embodiments, the set of dialogue frames is compressed more than the set of non-dialogue frames. For example, the dialogue frames are dropped by a higher percentage of frames than the non-dialogue frames. In this exemplary embodiment, the set of dialogue frames is compressed two times more than the set of non-dialogue frames because the user already heard the dialogue during an audio-only mode. At step 812, the media application combines the reduced sets to generate a video summary 714. The media application combines two non-dialogue frames 704, 708 and one dialogue frame 710 to generate video summary 714. At step 814, video summary 714 is generated for display.

Similar to the video summary, in some embodiments, an audio summary may be generated. For example, when a user switches from a video mode to an audio-only mode, an audio summary may be generated. The audio summary may indicate, "You are listening to season 1 and episode 3."

Figure 9:
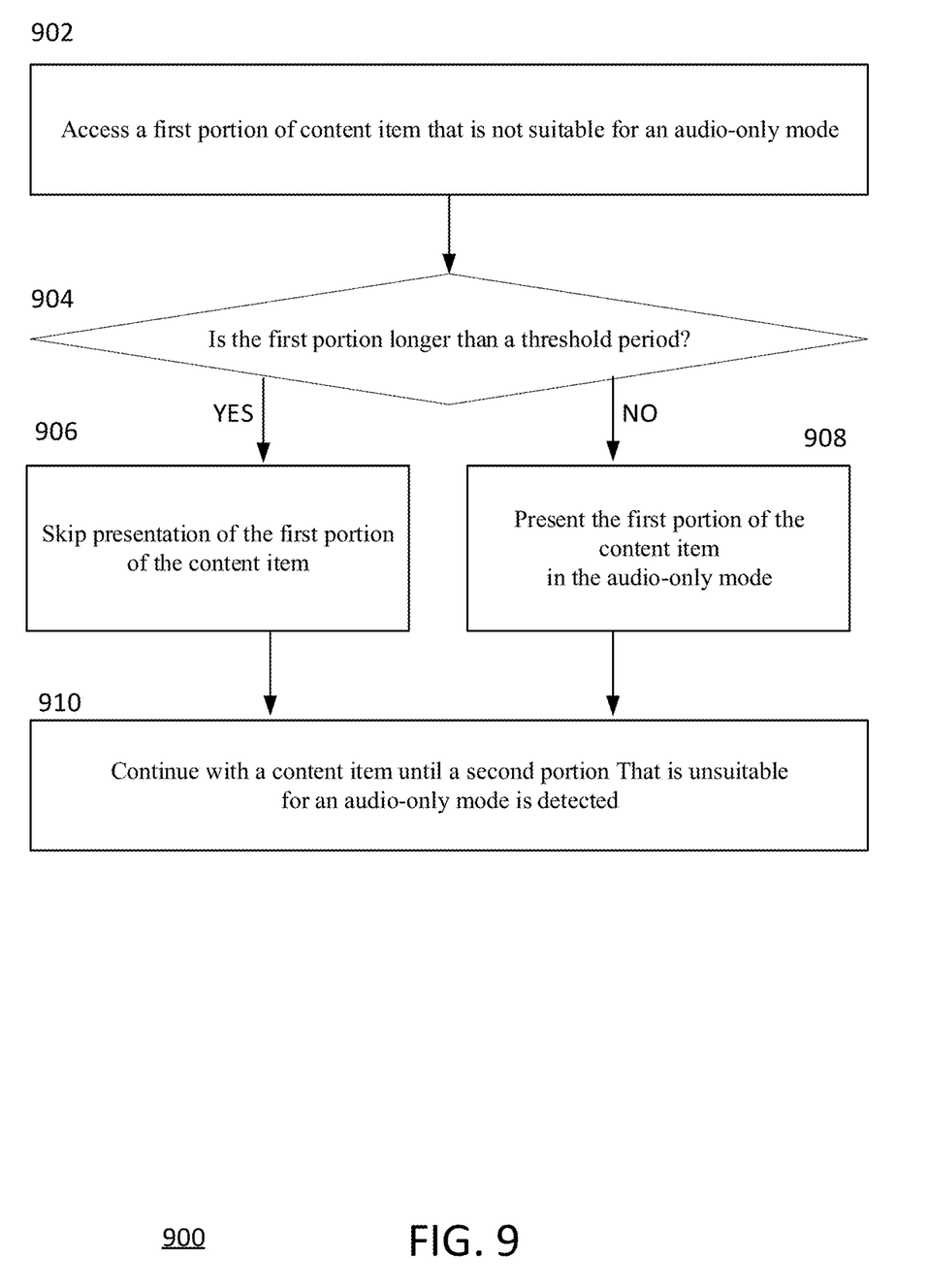
FIG. 9 depicts a flowchart of the process of skipping a portion of the content item based on duration, in accordance with some embodiments of the disclosure.

FIG. 9 depicts a flowchart of the process 900 of skipping a portion of the content item based on the duration of the portion of the content item that is not suitable to play in an audio-only mode, in accordance with some embodiments of the disclosure. For example, if the bandwidth availability is low, then the media application may skip presentation of a segment to save the network bandwidth. At step 902, the media application accesses a first portion of the content item that is not suitable to play in an audio-only mode (e.g., minutes 10-15). At step 904, the media application determines whether the first portion is longer than a threshold period (e.g., 30 seconds or two minutes). The threshold period may be adjusted and personalized for different users. Upon determining that the first portion is longer than the threshold period, at step 906, the media application skips or ceases the presentation of the first portion of the content item for the purpose of streamlining content consumption. Upon determining that the first portion is equal or shorter than the threshold period, at step 908, the media application presents the first portion in an audio-only mode. At step 910, the media application continues with the content item until another portion that is not suitable for an audio-only mode is detected.

Figure 10:
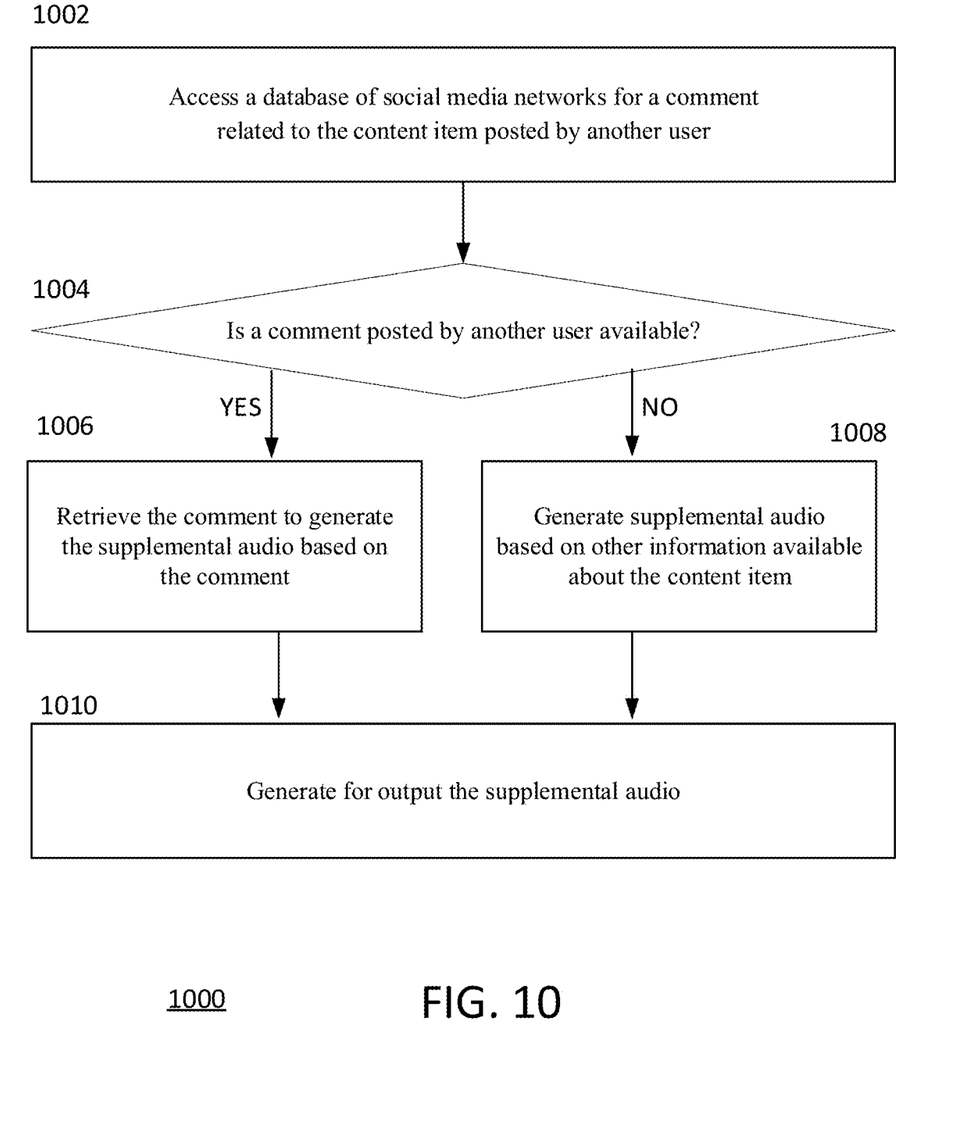
FIG. 10 depicts a flowchart of the process of generating supplemental audio content based on information received from social media networks, in accordance with some embodiments of the disclosure.

FIG. 10 depicts a flowchart of the process 1000 of generating supplemental audio based on information received from social media networks, in accordance with some embodiments of the disclosure. At step 1002, the media application accesses a database of social media networks for a comment or post related to the content item published by another user. The media application may retrieve such information from the user's social network account that is linked to the content provider service platform account via API calls.

At step 1004, the media application determines whether any post or comment published by the user's friends is available. If such information is available, at step 1006, the media application retrieves the comment to generate the supplemental audio based on the content-related information retrieved from the social media network (e.g., "80% of your friends like this show"). In some embodiments, as the user's friends create new comments related to the content item in real time, the supplemental content may be updated in real time, incorporating the new comments and updated information. The new comments may be stored as metadata or manifest associated with the content item and fetched from a database of social media networks. If such information is not available, at step 1008, the media application generates the supplemental audio based on other information available that can be retrieved from other sources (e.g., IMDB). At step 1010, the media application generates for output the supplemental audio.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   generating for output a content item, the content item comprising video and audio;
   based at least in part on determining that an audio-only mode is activated:
      determining that a portion of the content item contains video text that is only output in the video but not in the audio; and based at least in part on the determining that the portion of the content item contains the video text:
  determining whether the portion of the content item that contains the video text is longer than a threshold value;
  based at least in part on the determining that the portion of the content item that contains the video text is longer than the threshold value, skipping presentation of the portion; and
  based at least in part on determining that the portion of the content item that contains the video text is not longer than the threshold value, generating for output supplemental audio associated with the video text of the content item during the portion of the content item that contains the video text.

2. The method of claim 1, further comprising:
ceasing the output of the video of the content item during the audio-only mode.

3. The method of claim 1, further comprising:
in response to detecting that the audio-only mode is deactivated, generating for display a video summary of the portion of the content item, wherein the video summary comprises one or more frames of the portion of the content item that does not include dialogue.

4. The method of claim 3, further comprising:
wherein generating for display the video summary comprises:
  identifying a set of dialogue frames that comprises frames that occur during the portion of the content item and include dialogue;
  identifying a set of non-dialogue frames that comprises frames that occur during the portion of the content item and do not include dialogue;
  generating a reduced set of dialogue frames by compressing the set of dialogue frames; and
  generating a reduced set of non-dialogue frames by compressing the set of non-dialogue frames, wherein the set of dialogue frames is compressed more than the set of non-dialogue frames.

5. The method of claim 1, wherein the portion of the content item lacks the audio or includes a text that is not output as the audio.

6. The method of claim 5, further comprising:
processing the portion of the content item to identify a segment that displays the text in the video; and
extracting the text from the video, wherein the supplemental audio is generated based on the extracted text.

7. The method of claim 1, wherein the determining that the audio-only mode is activated is based at least in part on at least one of:
determining health-related data associated with the user, or
determining a bandwidth consumption level.

8. The method of claim 1, wherein the supplemental audio is based at least in part on at least one of trivia of the content item, a description of the content item, information about a character of the content item, information about music of the content item, or commentary of the content item.

9. The method of claim 1, further comprising:
accessing a database of social media network to retrieve a comment related to the content item, wherein the comment is posted by a second user different from a first user via a social media network; and
in response to determining that the comment related to the content item is available via the social media network:
  retrieving the comment to generate the supplemental audio for output.

10. The method of claim 1, wherein the determining that the portion of the content item contains the video text that is only output in the video but not in the audio comprises:
creating at least one vector from the video text;
creating at least one vector of the audio; and
comparing the at least one vector from the video text and the at least one vector of the audio.

11. A system comprising:
circuitry configured to:
  generate for output a content item, the content item comprising a video and an audio;
  based at least in part on determining that an audio-only mode is activated:
    determine that a portion of the content item contains video text that is only output in the video but not in the audio; and
    based at least in part on the determining that the portion of the content item contains the video text:
      determine whether the portion of the content item that contains the video text is longer than a threshold value;
      based at least in part on the determining that the portion of the content item that contains the video text is longer than the threshold value, skip presentation of the portion; and
      based at least in part on determining that the portion of the content item that contains the video text is not longer than the threshold value, generate for output supplemental audio associated with the video text of the content item during the portion of the content item that contains the video text.

12. The system of claim 11, wherein the circuitry is further configured to:
cease the output of the video of the content item during the audio-only mode.

13. The system of claim 11, wherein the circuitry is further configured to:
in response to detecting that the audio-only mode is deactivated, generate for display a video summary of the portion of the content item, wherein the video summary comprises one or more frames of the portion of the content item that does not include dialogue.

14. The system of claim 13, wherein the circuitry, when generating for display the video summary, is further configured to:
identify a set of dialogue frames that comprises frames that occur during the portion of the content item and include dialogue;
identify a set of non-dialogue frames that comprises frames that occur during the portion of the content item and do not include dialogue;
generate a reduced set of dialogue frames by compressing the set of dialogue frames; and
generate a reduced set of non-dialogue frames by compressing the set of non-dialogue frames, wherein the set of dialogue frames is compressed more than the set of non-dialogue frames.

15. The system of claim 11, wherein the portion of the content item lacks the audio or includes a text that is not output as the audio.

16. The system of claim 15, wherein the circuitry is further configured to:
process the portion of the content item to identify a segment that displays the text in the video; and
extract the text from the video, wherein the supplemental audio is generated based on the extracted text.

17. The system of claim 11, wherein the circuitry configured to determine that the audio-only mode is activated is based at least in part on at least one of the circuitry further configured to:
  determine health-related data associated with the user, or
  determine a bandwidth consumption level.

18. The system of claim 11, wherein the supplemental audio is based at least in part on at least one of trivia of the content item, a description of the content item, information about a character of the content item, information about music of the content item, or commentary of the content item.

19. The system of claim 11, wherein the circuitry is further configured to:
  access a database of social media network to retrieve a comment related to the content item, wherein the comment is posted by a second user different from a first user via a social media network; and
  in response to determining that the comment related to the content item is available via the social media network:
    retrieve the comment to generate the supplemental audio for output.

20. The system of claim 11, wherein the circuitry configured to determine that the portion of the content item contains the video text that is only output in the video but not in the audio is configured to:
  create at least one vector from the video text;
  create at least one vector of the audio; and
  compare the at least one vector from the video text and the at least one vector of the audio.

* * * * *